Feb. 8, 1938.  H. BANY  2,107,927
CONTROL SYSTEM
Filed Aug. 6, 1936
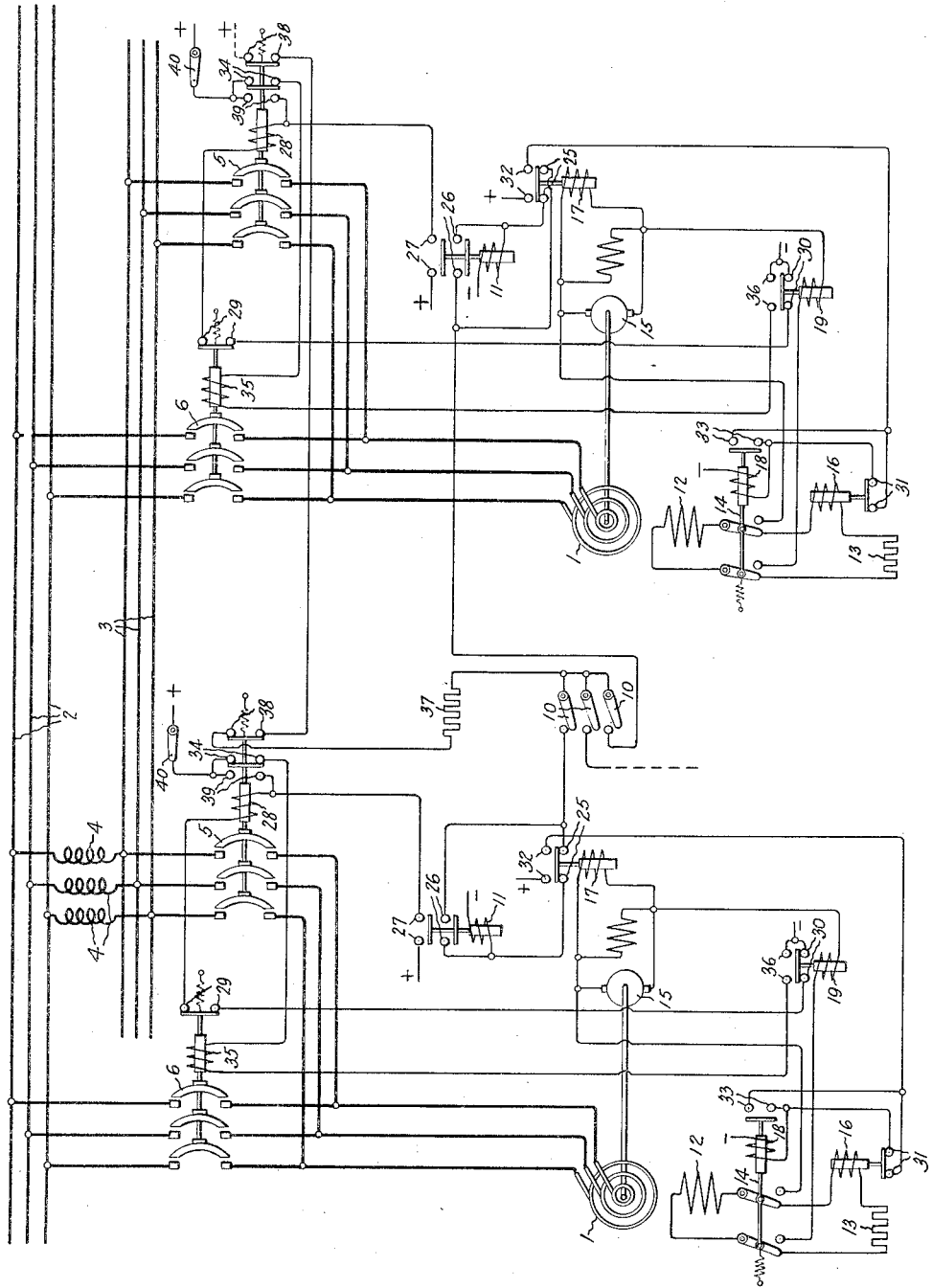
Inventor:
Herman Bany,
by Harry E. Dunham
His Attorney.

Patented Feb. 8, 1938

2,107,927

UNITED STATES PATENT OFFICE 2,107,927

CONTROL SYSTEM

Herman Bany, Lansdowne, Pa., assignor to General Electric Company, a corporation of New York Application August 6, 1936, Serial No. 94,628

7 Claims. (Cl. 175—320)

My invention relates to control systems and particularly systems for controlling the operation of a plurality of devices so that only one of the devices can be in operation at any instant, and its object is to provide an improved control arrangement for accomplishing this result.

My invention will be better understood from the following description when taken in connection with the accompanying drawing, and its scope will be pointed out in the appended claims.

In the accompanying drawing, which diagrammatically illustrates a control arrangement for a plurality of dynamo-electric machines embodying my invention, I have shown a control arrangement for starting a plurality of synchronous motors, but it is obvious that my invention is applicable to arrangements for controlling the operation of other types of dynamo-electric machines.

Referring to the drawing, a plurality of synchronous motors 1 are shown as being arranged to be supplied with current from a common supply circuit 2. It is to be understood, however, that my invention is not limited to a control arrangement for two motors, but it may be used with a control arrangement for as many motors as desired.

In order to effect the starting of each synchronous motor, I provide a common starting bus 3, the voltage of which is relatively low with respect to the voltage of the supply circuit 2. Suitable voltage reducing means, such as impedances 4, are interposed between the circuit 2 and the starting bus 3 so as to reduce the voltage of the bus 3 with respect to the voltage of the supply circuit 2. Each synchronous motor 1 has associated therewith a starting switch 5 which, when closed, connects the armature winding of the associated motor to the starting bus 3 so that a relatively low voltage is impressed upon the motor armature winding to effect the starting of the motor. Each motor has also associated therewith a running breaker 6 which, when closed, connects the armature winding of the associated motor directly across the supply circuit 2 so that a relatively high voltage may be impressed upon the motor armature winding after the motor has been started.

Any suitable control means, examples of which are well known in the art, may be employed for controlling the sequential operation of the switches 5 and 6 associated with each motor so as to effect the starting thereof. As shown in the drawing, each motor has associated therewith a master starting element 10 shown as a manually controlled switch, which, when closed, effects the energization of a starting relay 11. Each starting relay 11, when energized, effects the closing of the associated starting switch 5 so that the armature winding of the associated synchronous motor is connected to the starting bus 3 to effect the starting of the motor. While the motor is accelerating to synchronous speed, the field winding 12 of the motor is short-circuited through a discharge resistor 13. When the motor reaches a predetermined speed near synchronous speed, a suitable speed responsive device effects the operation of a field switch 14 to disconnect the motor field winding 12 from the discharge resistor 13 and to connect the field winding 12 to a suitable source of excitation, such as an exciter 15 driven by the synchronous motor. As shown in the drawing, the speed responsive device is a current relay 16 which is connected so as to be energized in response to the current induced in the motor field winding 12 by transformer action while the motor is operating below synchronous speed as an induction motor and which cooperates with a voltage relay 17 responsive to the exciter voltage to effect the energization of the closing coil 18 of the field switch 14 when the induced current in the field winding 12 is below a predetermined value and the exciter voltage is above a predetermined value. After the field switch 14 closes, the starting switch 5 is opened and the running switch 6 is closed. As shown in the drawing, this result is accomplished by means of a current relay 19 which is responsive to the current supplied to the motor through the field winding 12 by the exciter 15. When the motor field current increases above a predetermined value, the field relay 19 operates to effect the opening of the starting switch 5 and the closing of the running switch 6.

In order to prevent more than one starting switch 5 from being closed at any instant, I provide, in accordance with my invention, an arrangement whereby the closing of a starting control switch 10 effects the operation of its associated starting relay 11 only when no other starting control switch 10 is closed, and all of the starting switches 5 are open. In the particular embodiment of my invention shown in the drawing, this result is accomplished by providing a common impedance device 37 and the auxiliary contacts 38 of each starting switch 5 in series in the energizing circuit of each master starting relay 11. The impedance of the common impedance device 37 is high relative to the impedance of each master relay 11 so that when only a single starting control switch 10 is closed, the voltage drop across the associated master starting relay 11 is sufficient to pick up the relay, but when two or more starting control switches 10 are simultaneously closed, the voltage drop across the parallel connected master starting relays is so low that the relays do not pick up and close their respective contacts.

The operation of the arrangement shown in the drawing is as follows: When both of the synchronous motors 1 are not in operation, the control devices 10 associated with the motors are in the positions shown in the drawing so that all of the master relays 11 are de-energized.

When it is desired to start any of the synchronous motors, the associated starting control switch 10 is closed. The closing of this switch completes an energizing circuit for the associated master starting relay 11 through contacts 25 of the associated de-energized exciter voltage relay 17, the common impedance device 37 and the auxiliary contacts 38 on each of the starting switches 5. If only one starting control switch 10 is closed, sufficient current flows through the winding of the master starting relay 11 associated with the closed starting control switch 10 to cause the relay to pick up. By closing its auxiliary contacts 26, the energized relay 11 completes a locking circuit for its winding around the contacts 25 of the associated exciter relay 17.

By closing its contacts 27, the energized master starting relay 11 completes an energizing circuit for the closing coil 28 of the associated starting switch 5. This circuit also includes auxiliary contacts 29 on the associated running switch 6 and contacts 30 of the associated motor field relay 19, which is de-energized. By closing its contacts 39 the switch 5 completes a locking circuit for the closing coil 28 through the normally closed associated stopping switch 40. The closing of the switch 5 impresses a relatively low voltage on the armature winding of the associated synchronous motor 1 to effect the starting thereof. While the motor is accelerating to synchronous speed, the current induced in the motor field winding 12 by transformer action maintains the contacts 31 of the associated current relay 16 open. When the motor reaches substantially synchronous speed, the associated current relay 16 closes its contacts 31 and if the voltage of the associated exciter 15 is above a predetermined value so that the contacts 32 of the associated exciter voltage relay 17 are closed, an energizing circuit is completed for the closing coil 18 of the associated field switch 14. The closing coil 18, when energized, disconnects the motor field winding 12 from the discharge resistor 13 and connects the field winding across the terminals of the associated exciter 15. The field switch 14, by closing its auxiliary contacts 33, completes a holding circuit for its winding 18 which is independent of the contacts of the associated current relay 16. As soon as the motor field current increases above a predetermined value, the associated motor field relay 19 opens its contacts 30 in the circuit of the closing coil 28 of the starting switch 5 so that the motor is disconnected from the starting bus 3. As soon as the starting switch 5 opens so that its auxiliary contacts 34 are closed, an energizing circuit is completed for the closing coil 35 of running switch 6 to connect the armature winding of the motor directly across the supply circuit 2. The energizing circuit of the closing coil 35 also includes the normally closed associated stopping switch 40, the contacts 34 of associated starting switch 5, and the contacts 36 of the associated motor field relay 19.

If one or more switches 10 are simultaneously closed, the resultant impedance of the two parallel-connected windings of the associated master relays 11 is so low relative to the impedance of the impedance device 37 that neither of them is sufficiently energized to pick up and close its associated contacts 27 to effect the closing of the associated starting switch 5. Therefore, it will be seen that it is impossible for an operator to effect the simultaneous closing of two starting switches 5 by simultaneously closing two starting control switches 10.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a plurality of relays, an impedance device having a high impedance relative to the impedance of one of said relays, a source of current, and switching means individual to each relay for connecting the associated relay and said common impedance in series across said source, the relative impedances of said impedance device and said relays being such that when a predetermined plurality of said relays are simultaneously connected in series with said impedance device the voltage impressed on said connected relays is below the pick-up value thereof.

2. In combination, a plurality of switches, a relay associated with each switch and arranged when energized to effect the operation of the associated switch, an impedance device having a high impedance relative to the impedance of one of said relays, a source of current, and switching means individual to each relay for connecting the associated relay and said common impedance in series across said source.

3. In combination, a plurality of switches, a relay associated with each switch and arranged when energized to effect the operation of the associated switch, an impedance device having a high impedance relative to the impedance of one of said relays, a source of current, switching means individual to each relay for connecting the associated relay and said common impedance in series across said source, and means controlled by said switches for interrupting the connection between said impedance device and said source when any of said switches is operated.

4. In combination, a plurality of switches, individual closing means for each switch including a relay and means responsive to a predetermined energization of the relay for effecting the closing of the associated switch, a source of current, an impedance device having a high impedance relative to the impedance of any of said relays, and means individual to each relay for connecting the associated relay and said impedance device in series across said source.

5. In combination, a plurality of switches, individual closing means for each switch including a relay and means responsive to a predetermined energization of the relay for effecting the closing of the associated switch, a source of current, an impedance device having a high impedance relative to the impedance of any of said relays, means individual to each relay for connecting the associated relay and said impedance device in series across said source, and means controlled by said switches for interrupting the connection between said impedance device and said source when any of said switches are closed.

6. In combination, a control device, switching means normally responsive to a predetermined operation of said device, a second control device, other switching means normally responsive to a predetermined operation of said second control device, and means for preventing the operation of either of said switching means when said predetermined operations of said devices occur simultaneously.

7. In combination, a plurality of relays, an impedance device, a source of current, and switching means individual to each relay for connecting said impedance device in series with the associated relay and said source, the impedances of said impedance device and relays being so arranged that when a predetermined plurality of said relays are simultaneously connected in series with said impedance device the voltage impressed on the connected relays is below the pick-up value thereof.

HERMAN BANY.